United States Patent
Soloveichik

(10) Patent No.: US 8,632,672 B2
(45) Date of Patent: Jan. 21, 2014

(54) STAINLESS STEEL ANODES FOR ALKALINE WATER ELECTROLYSIS AND METHODS OF MAKING

(75) Inventor: Grigorii Lev Soloveichik, Latham, NY (US)

(73) Assignee: General Electric Company, Niskayuna, NY (US)

(*) Notice: Subject to any disclaimer, the term of this patent is extended or adjusted under 35 U.S.C. 154(b) by 2481 days.

(21) Appl. No.: 11/506,551

(22) Filed: Aug. 18, 2006

(65) Prior Publication Data

US 2013/0220827 A1 Aug. 29, 2013

(51) Int. Cl.
*C25B 1/04* (2006.01)
*C25B 9/00* (2006.01)

(52) U.S. Cl.
USPC ........... 205/628; 205/630; 205/631; 205/632; 205/638; 205/639

(58) Field of Classification Search
USPC ................................................ 205/628–639
See application file for complete search history.

(56) References Cited

U.S. PATENT DOCUMENTS 4,282,178 A * 8/1981 Khare .............................. 422/13

OTHER PUBLICATIONS

American Society for Metals, A. C. Fraker, Nat'l. Bureau of Standards, "Corrosion of Metallic Implants and Prosthetic Devices; Electochemistry and Basic Corrosion Processes". 2004, pp. 1-8.
I. Abe, T. Fujimaki, Y. Kajiwara, and Y. Yokoo; "Hydrogen Production by High Temperature, High Pressue Water Electrolysis I, Plant Development". In 3rd World Hydrogen Energy Conference. 1980, Tokyo: Pergamon, Oxford, pp. 29-41.
Gras, J. M., P. Spiteri, "Corrosion of Stainless Steels and Nickel-Base Alloys for Alkaline Water Electrolysis". 1993, Dep. Etude Mater., Dir. Etud. Rech., Fr. pp. 561-566.

* cited by examiner

*Primary Examiner* — Arun S Phasge
(74) *Attorney, Agent, or Firm* — Francis T. Coppa

(57) ABSTRACT

The corrosion resistance of stainless steel anodes for use in alkaline water electrolysis was increased by immersion of the stainless steel anode into a caustic solution prior to electrolysis. Also disclosed herein are electrolyzers employing the so-treated stainless steel anodes. The pre-treatment process provides a stainless steel anode that has a higher corrosion resistance than an untreated stainless steel anode of the same composition.

11 Claims, 2 Drawing Sheets

STAINLESS STEEL ANODES FOR ALKALINE WATER ELECTROLYSIS AND METHODS OF MAKING

STATEMENT REGARDING FEDERALLY SPONSORED RESEARCH OR DEVELOPMENT

The United States Government may have certain rights in this invention pursuant to contract number DE-FC36-04GO14223 awarded by the Department of Energy (DOE).

BACKGROUND OF THE INVENTION

The present disclosure relates to electrolysis, particularly to water electrolysis, and more particularly, to increasing corrosion resistance of stainless steel anodes for use in alkaline water electrolysis.

During alkaline water electrolysis for the production of hydrogen, an electrical current is applied between a pair of inert electrodes immersed in an aqueous liquid electrolyte. The liquid electrolyte is frequently a 25 to 30 weight percent (wt %) potassium hydroxide solution. The negatively charged electrode is called the cathode, and the positively charged electrode is known as the anode. Each electrode attracts ions which are of the opposite charge. Therefore, positively charged ions (i.e., cations) move towards the cathode, while negatively charged ions (i.e., anions) move toward the anode. The energy required to separate the ions is in the form of electrical current provided by an electrical power supply that causes the ions to gather at the respective electrodes.

In this process, hydrogen and oxygen are evolved at the cathode and anode, respectively. At the cathode surface, in addition to reduction of protons to hydrogen, positively charged metal ions are reduced to a solid (electrons are gained), thereby creating electrochemical protection from the environment to which it is exposed. However, because the anode has a lower electrical potential (an "under" potential), the anode metal is oxidized (electrons are lost) and experiences a sacrificial weight loss during the electrochemical reaction. This is largely dependent on the specific electrode material, on the operating temperature, and on the amount of electrical current passing through electrode surface (current density). Electricity utilizes ionic species (electrolytes) in the water to travel, therefore the higher the concentration of ions in solution, the further and quicker electricity can travel through the water medium to attack the anode.

Anodes have been formed from nickel or stainless steel. Stainless steels are high-alloy steels that have superior corrosion resistance compared to other steel alloys because they contain large amounts of chromium. Generally, nickel based steels have the greatest corrosion stability in caustic environments when used as an anode in comparison with stainless steels using other metal alloys, especially when exposed to hot caustic. Generally, higher concentrations of nickel provide greater corrosion resistance and stability. However, stainless steels having higher concentrations of nickel are relatively more expensive than stainless steels having lower concentrations of nickel and are also more difficult to machine. Consequently, the use of stainless steel alloys having high nickel contents, or for that matter, the use of pure nickel as an anode material is not considered to be economical in alkaline water electrolysers. Lower concentrations of nickel-based stainless steels are even less preferred due to their lower corrosion resistance and sacrificial loss during use.

Accordingly, there is a need in the art for new materials for use as anodes that can provide increased corrosion resistance to the anode for use in alkaline water electrolysers, wherein the anode is substantially non-reactive and consumption is minimized and/or prevented.

BRIEF DESCRIPTION OF THE INVENTION

Disclosed herein are an electrolysis cell and process using stainless steel anodes with improved corrosion resistance. In one embodiment, a process for improving corrosion resistance of stainless steel anodes for alkaline water electrolysis comprises immersing an anode formed of stainless steel into a caustic solution prior to using the anode in an alkaline water electrolyzer; and electrolyzing an aqueous solution in an electrolyzer comprising the stainless steel anode, wherein the immersed stainless steel anode has a higher corrosion resistance than an untreated stainless steel anode of the same composition.

The alkaline electrolysis cell for hydrogen generation comprises a cathode; an anode, wherein the anode is formed of stainless steel having first been immersed in a first caustic solution prior to electrolysis at an elevated temperature and for a period of time effective to increase corrosion resistance, wherein the stainless steel anode has a higher corrosion resistance than an untreated stainless steel anode of the same composition; and an electrolyte intermediate the anode and cathode, wherein the electrolyte comprises a second caustic solution.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION OF THE INVENTION

Figure 1:
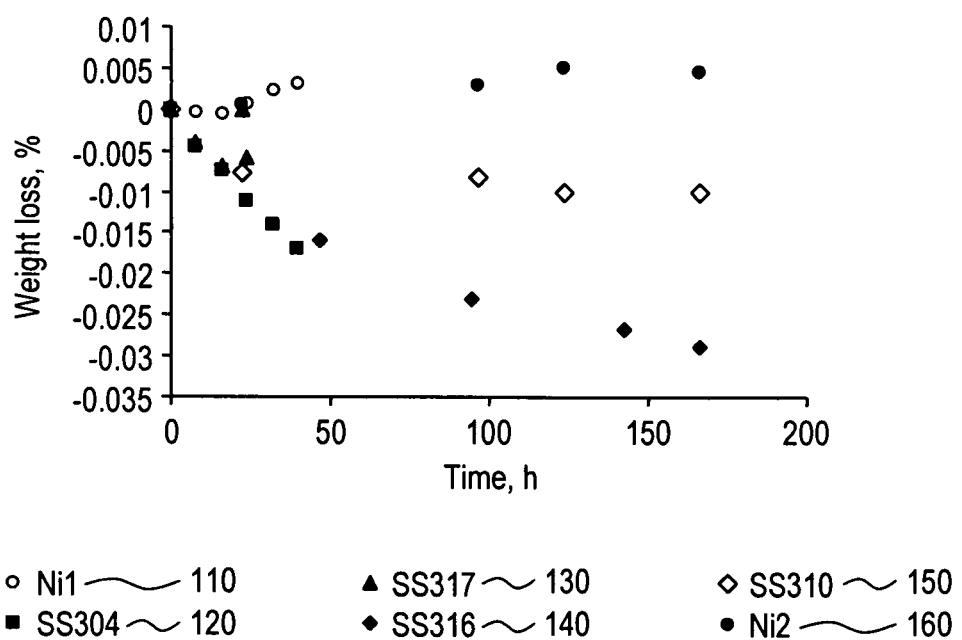
FIG. 1 is a plot of the weight change for untreated stainless steel anodes and nickel cathodes during alkaline water hydrolysis.

The present disclosure is generally directed to a process for treating stainless steel anodes prior to use in electrolysis, wherein the corrosion resistance of the stainless steel electrode is increased relative to an untreated stainless steel anode formed of the same composition. Advantageously, the process permits the use of stainless steels having lower concentrations of nickel as anodes for use in alkaline water electrolysis, i.e., stainless steels having less than or equal to about 12 weight percent (wt %) nickel. In one embodiment, the stainless steel anode is immersed in a caustic solution for a period of time and at a temperature effective to increase corrosion resistance. Immersion is done prior to electrolysis and may be in a separate container or may occur within the electrolyzer itself as long as immersion occurs prior to electrolysis.

As used herein, the term "stainless steel" is defined as a ferrous alloy having a minimum chromium content of about 10.5 wt %. Stainless steels generally have a higher resistance to oxidation and corrosion in many natural and man made environments. However, this is not adequate to resist corrosion in the alkaline environments that may occur during alkaline electrolysis; higher chromium concentrations and the judicious use of other solutes such as molybdenum, nickel and nitrogen are often needed to ensure a robust material.

Nickel is known to significantly improve the general corrosion resistance of stainless steels by promoting passivation. Austenitic stainless steels therefore possess superior corrosion resistance when compared with martensitic or ferritic stainless steels (with zero or low nickel concentrations). However, the price of stainless steels generally increases with increasing concentrations of nickel. For example, the price of a high nickel alloy stainless steel, such as Type 310 (about 19 to about 22 wt % nickel) stainless steel or Type 316 (about 10 to about 14 wt % nickel) stainless steel is usually about 70 to about 80 percent higher than the price of Type 304 (about 8 to about 10.5 wt % nickel) stainless steel. Therefore, replacement of Type 310 with a lower cost stainless steel such as Type 304 in identical applications (and specifically for anodes) is very desirable. It has unexpectedly been discovered that less expensive stainless steels can be used as anodes when subjected to the treatment process prior to its use in alkaline water electrolysis. Moreover, it has unexpectedly been discovered that the treatment process can be applied to any stainless steel to achieve the benefits described herein.

As previously discussed, the treatment process includes immersing the stainless steel anode into a caustic solution for a period of time and a temperature to increase the corrosion resistance in an amount suitable for the intended alkaline water electrolysis application. The caustic solution can comprise the same or a different caustic than that used during alkaline water electrolysis or the caustic solution may be a mixture of caustics. The caustic is generally an aqueous solution containing a metal hydroxide of the formula MOH, wherein M is an alkali metal or an alkaline earth metal. Suitable caustics include potassium hydroxide, sodium hydroxide, lithium hydroxide, calcium hydroxide, barium hydroxide, and the like. The concentration of the caustic is not intended to be limited and can vary depending on the intended electrolysis application and pre-treatment time. Higher concentrations are generally preferred with shorter pretreatment times. In one embodiment, the temperature is increased during the pretreatment process to accelerate the pretreatment time. Optimization of these parameters is well within the routine skill of those in the art.

Of the various caustics, potassium hydroxide is particularly exemplary since it is often used as the electrolyte in alkaline water electrolysis. Therefore, treatment of the stainless steel anodes with potassium hydroxide solutions prior to use in the electrolyzer is practical. In one embodiment, the caustic solution comprises greater than or equal to about 30 wt % potassium hydroxide and is at an elevated temperature, e.g., greater than or equal to about 50 degrees Celsius (° C.). In other embodiments, the pretreatment solution may also comprise NaOH, KOH, LiOH, and mixtures thereof, in various ratios.

The caustic solution may further comprise a corrosion inhibitor, which is a chemical compound that stops or slows down corrosion of metals and alloys during electrolysis. Suitable corrosion inhibitors are hexamine, phenylenediamine, dimethylethanolamine, sodium nitrite, cinnamaldehyde, condensation products of aldehydes and amines or imines, chromates, nitrites, phosphates, hydrazine, ascorbic acid, and the like. The suitability of any given chemical for a task in hand depends on many factors, from the material of the system they have to act in, to the nature of the substances they are added into, and their operating temperature.

The present disclosure is illustrated by the following non-limiting examples.

EXAMPLE 1

In this example, various steel compositions in the form of coupons were immersed in a 30 wt % potassium hydroxide solution for a defined period of time, and corrosion resistance was then measured during alkaline water electrolysis. The stainless steel coupons were commercially obtained from Arcadia Metal Industry C. Rokas, SA. The composition of the steels is provided in Table 1.

TABLE 1

Stainless steel compositions by weight percent (balance Fe)

| Stainless Steel | C | Mn | Si | P | S | Cr | Mo | Ni | N |
|---|---|---|---|---|---|---|---|---|---|
| Type 304 | 0.08 | 2 | 0.73 | 0.045 | 0.03 | 18 | — | 8 | 0.1 |
| Type 304 (L) | 0.03 | 2 | 0.75 | 0.045 | 0.03 | 18 | — | 8-12 | 0.1 |
| Type 316 (L) | 0.03 | 2 | 0.75 | 0.045 | 0.03 | 17 | 2-3 | 10-14 | 0.1 |
| Type 310 | 0.08 | 2 | 1.5 | 0.045 | 0.3 | 24-26 | — | 19-22 | — |
| Type 317 (L) | 0.08 | 2 | 0.75 | 0.04 | 0.03 | 18-20 | 3-4 | 11-15 | 0.1 |

(L) indicates low carbon steel

The laboratory setup for metal corrosion testing included a 1.2 kiloWatt (kW) power supply commercially obtained from the Xantrex Company, current and voltage meters, 2 metal electrodes, Teflon screws and spacers to maintain an approximately 0.3 inch separation between the electrodes, a beaker with approximately 275 milliliters (mL) of the 30 wt % KOH solution, a silicon oil bath (SF96-50) and a StableTemp's digital stirring hot plate with a temperature probe and ring stand.

To provide the ability to run continuously (i.e., 24 hours per day for 7 days per week), the liquid level was kept constant by replenishment with deionized (DI) water. Standard metal coupons (1 inch by 2 inches with a thickness of ⅛ inch) or strips of ¹⁄₁₆ inch thick metal foil (1 inch by 2 inches; No. 10 hole ½ inch from the 1 inch side) were used for the corrosion testing. The working surface area was about 4.5 square centimeters ($cm^2$) for the standard metal coupons and 17 $cm^2$ for the "big" or "large" metal coupons. Testing was carried out at a current density of about 250 milliAmperes per square centimeter ($mA/cm^2$) and at a temperature of 70° C. Control coupons were washed with acetone, rinsed with DI water and then dried. Treated coupons were placed in the 30 wt % KOH solution at a temperature of about 100- to about 110° C. for about 16 hours. The coupons were weighed before electrolysis and periodically during electrolysis. The corrosion rate and method of cleaning and testing of the metals (in mils per year, wherein one mil is one thousandth of an inch) at each data point was determined according to the American Society for Testing Materials—ASTM G31. The results are provided in FIGS. 1 and 2 and in Table 2.

TABLE 2

Corrosion rate of steel anodes in alkaline water electrolysis (rate in mils/yr.)

| Metal | Coupon size | Initial Rate (mils/yr) | Long term rate (mils/yr) |
|---|---|---|---|
| Type 316* untreated | 17 $cm^2$ | 1.35 | 0.65 |
| Type 310* untreated | 17 $cm^2$ | 0.62 | 0.25 |
| Type 317* untreated | 17 $cm^2$ | 4.3 | 2.0 |
| Type 304 untreated** | 4.5 $cm^2$ | 1.35 | 0.52 |
| Type 304 treated** | 4.5 $cm^2$ | 0.45 | *** |

**average of three samples,
***weight gain.

During testing of the different anode materials, it was unexpectedly found that treatment of Type 304 stainless steel coupons pretreated prior to electrolysis in the 30 wt % KOH solution substantially increased corrosion resistance after as much as 30 hours immersion time at a temperature above 70° C. It was found that the treated coupons of Type 304 stainless steel were statistically (t-test) more corrosion resistant than untreated ones and comparable in corrosion resistance to untreated Type 310 stainless steel coupons (higher nickel concentration). During electrolysis, the sacrificial weight loss of treated Type 304 stainless steel was essentially stopped after about 120- to about 160 hours (long term rate testing), and even some weight gain was registered for the Type 304 coupons, while the behavior of untreated coupons was poor, as shown in FIG. 1 and Table 2.

As evidenced in the data presented in FIG. 1 and Table 2, untreated Type 304 stainless steel (lowest nickel content) exhibited the highest corrosion rate and, therefore, the lowest corrosion resistance. It was observed that untreated Type 304 had severe weight loss in a relatively short (i.e., less than about 100 hours) time. As used herein, an acceptable corrosion rate is one which is less than about 1.5 to about 2.0 millimeters (mm) or 150-200 mils of the anode disappears in about 10 years (i.e., standard anticipated anode lifetime in an alkaline water electrolyzer). In FIG. 1, the weight loss of the metal coupons was measured in percent weight loss versus time during electrolysis. Comparisons were performed with two Ni controls ("Ni1" and "Ni2" as shown in FIG. 1). The other coupons represented include Type 304, Type 317, Type 316 and Type 310. The treatment of Type 304 coupons in the hot 30 wt % KOH solution substantially increased the corrosion resistance to a level at or better than (for long term study) that of Type 310 (see e.g., FIG. 2 and Table 2).

Figure 2:
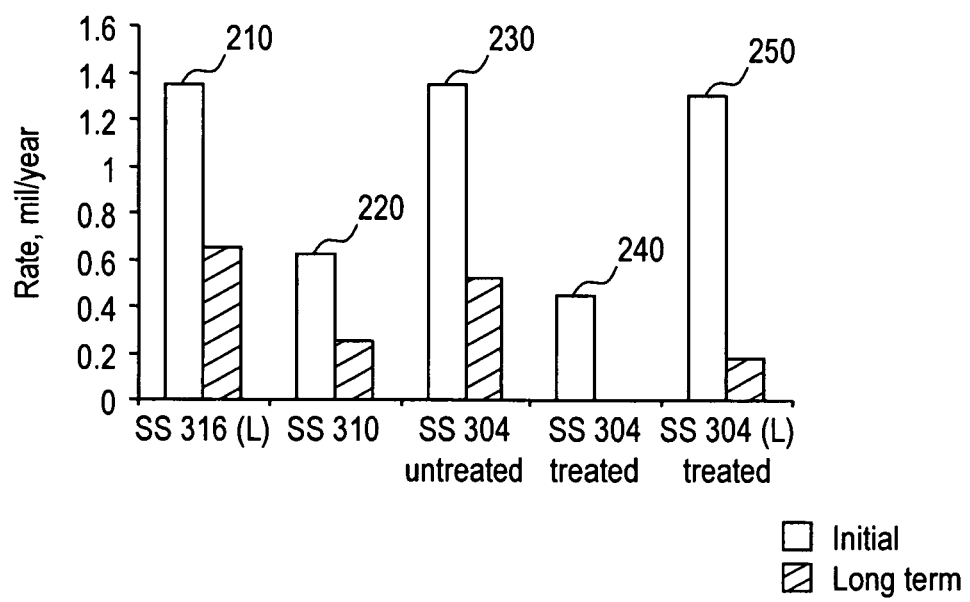
FIG. 2 is a plot of the initial and long-term corrosion rate of some stable steels at 90 degrees Celsius in a 30 weight percent solution of potassium hydroxide under a positive potential.

FIG. 2 illustrates the initial and long term corrosion rates of stable stainless steels treated with the 30 wt % KOH solution at about 100 to about 110° C. The corrosion rate was measured at about 90° C. in the presence of a positive potential. In this figure, rates are measured in mil/year. The treatment with the caustic solution prior to electrolysis surprisingly increased the corrosion resistance of stainless steel Type 304 (both initially and long term). In contrast, although low carbon Type 304 (L) exhibited higher initial corrosion rates, the corrosion rate appeared to be stable over the long term. The other untreated stainless steels tested (i.e., Type 316, Type 310, and Type 304L) all exhibited higher rates of metal loss, and therefore higher corrosion rates. The initial corrosion rate test times in the caustic bath for the anodes was about 50 hours. Long term corrosion rate test times were about 150 to about 250 hours, or more.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A process for improving the corrosion resistance of a stainless steel anode for alkaline water electrolysis, the process comprising:
    immersing an anode formed of a stainless steel having a nickel concentration less than about 12 percent by weight of the stainless steel, into a caustic solution, prior to using said anode in an alkaline water electrolyzer; and
    electrolyzing an aqueous solution in an electrolyzer comprising the anode, wherein the immersed stainless steel anode has a higher corrosion resistance than an untreated stainless steel anode of the same composition.

2. The process of claim 1, further comprising heating the caustic solution to a temperature of about 70 degrees Celsius to about 130 degrees Celsius.

3. The process of claim 1, wherein the caustic solution comprises a metal hydroxide solution heated to a temperature of about 70 degrees Celsius to about 130 degrees Celsius.

4. The process of claim 3, wherein the temperature of the metal hydroxide solution is about 90 degrees Celsius to about 110 degrees Celsius.

5. The process of claim 1, wherein the caustic solution comprises a greater than or equal to about 25 weight percent potassium hydroxide solution.

6. The process of claim 1, wherein the stainless steel anode is Type 304 stainless steel.

7. The process of claim 1, wherein the caustic solution further comprises a corrosion inhibitor selected from the group consisting of hexamine, phenylenediamine, dimethylethanolamine, sodium nitrite, cinnamaldehyde, condensation products of aldehydes and amines or imines, chromates, nitrites, phosphates, hydrazine, ascorbic acid, and mixtures thereof.

8. An alkaline electrolysis cell for hydrogen generation, comprising:
    a cathode;
    an anode, wherein the anode is formed of stainless steel having a nickel concentration less than about 12 percent by weight of the stainless steel, and having first been immersed in a first caustic solution prior to electrolysis for a period of time effective to increase corrosion resistance, wherein the stainless steel anode has a higher corrosion resistance than an untreated stainless steel anode of the same composition; and
    an electrolyte intermediate the anode and cathode, wherein the electrolyte comprises a second caustic solution.

9. The electrolysis cell of claim 8, wherein the stainless steel anode is a Type 304 stainless steel.

10. The electrolysis cell of claim 8, wherein the first and second caustic solutions comprise potassium hydroxide.

11. The electrolysis cell of claim 8 wherein the first caustic solution further comprises a corrosion inhibitor selected from the group consisting of hexamine, phenylenediamine, dimethylethanolamine, sodium nitrite, cinnamaldehyde, condensation products of aldehydes and amines or imines, chromates, nitrites, phosphates, hydrazine, ascorbic acid, and mixtures thereof.

* * * * *